April 27, 1965    J. MULLER    3,180,362
ROTARY AND RECIPROCATING ACTUATED VALVE
Filed Nov. 27, 1962    3 Sheets-Sheet 1
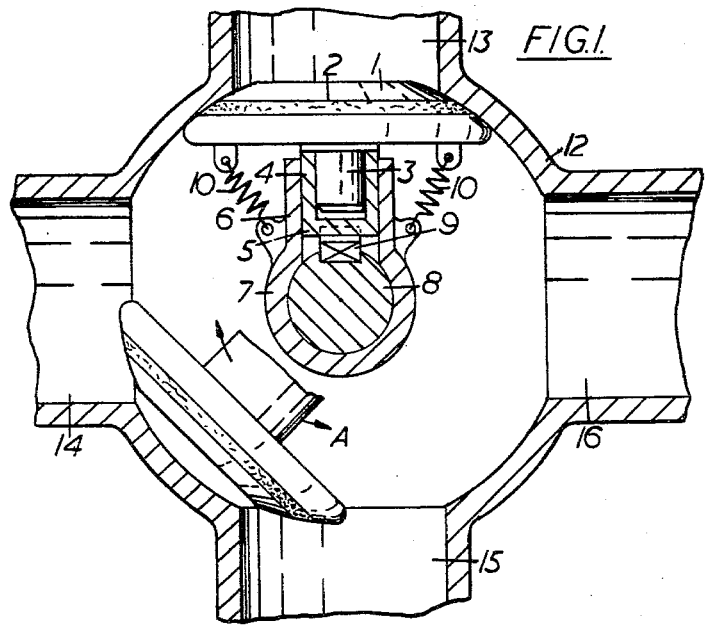
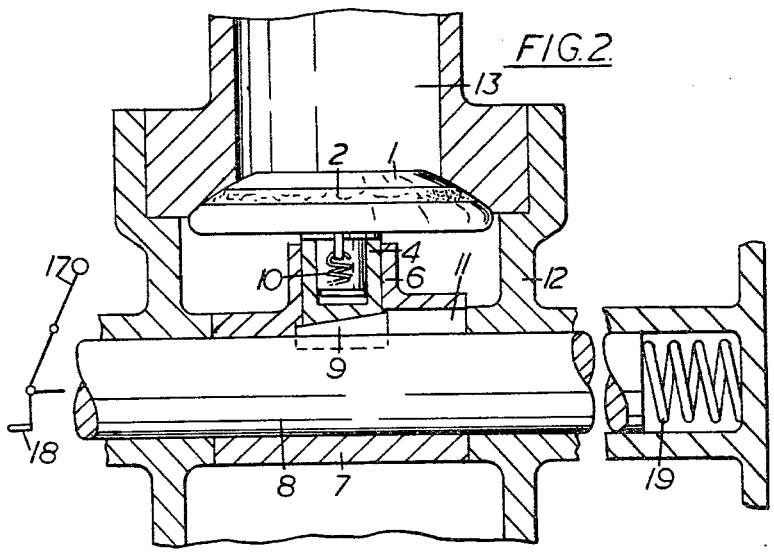
Inventor
JACQUES MULLER
By *Finnie and Finley*
Attorneys April 27, 1965  J. MULLER  3,180,362
ROTARY AND RECIPROCATING ACTUATED VALVE
Filed Nov. 27, 1962  3 Sheets-Sheet 2

Inventor
JACQUES MULLER
By *Imirie and Smiley*
Attorneys

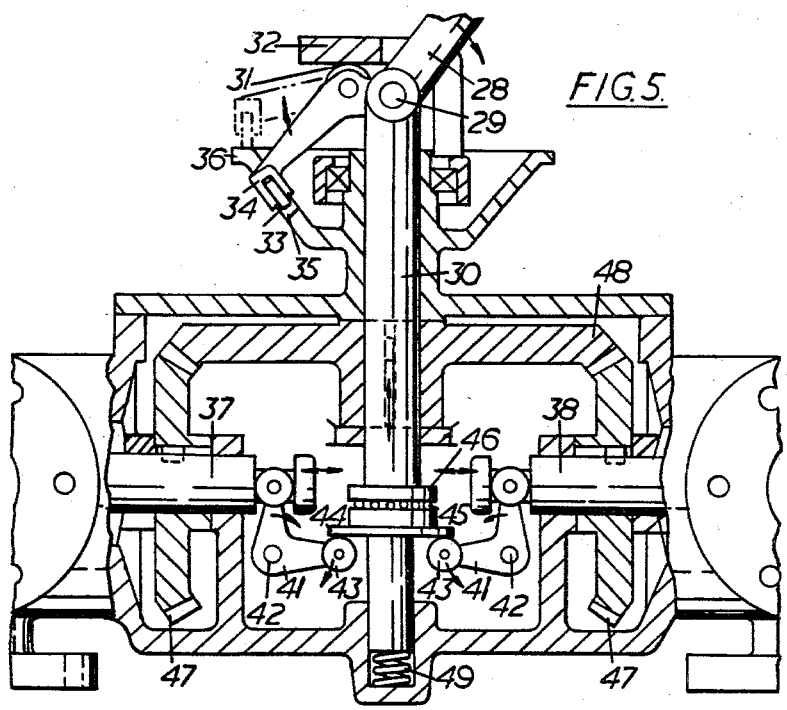
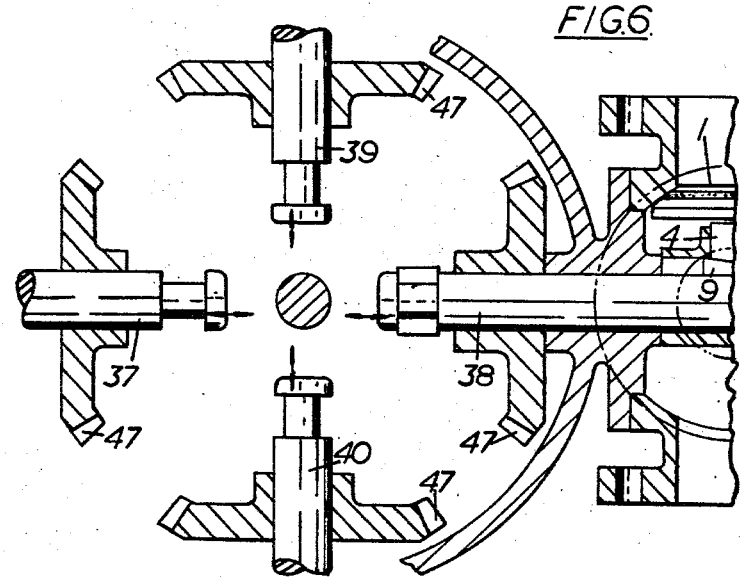

United States Patent Office 3,180,362
Patented Apr. 27, 1965

3,180,362
ROTARY AND RECIPROCATING ACTUATED VALVE
Jacques Muller, 123 Ave. du General de Gaulle, La Garenne-Colombes, Seine, France
Filed Nov. 27, 1962, Ser. No. 240,397
Claims priority, application France, Dec. 1, 1961, 880,677
5 Claims. (Cl. 137—636.4)

This invention relates generally to fluid control valves, and more particularly to a novel type of control valve for controlling a plurality of fluid passages radiating from a body, in which the moving valve member is so arranged as to provide exceptionally good pressure sealing against high pressures but in which the moving valve member is rotated without making contact with any other part, so that it suffers no wear during rotation from one control position to another.

Control valves for controlling a plurality of fluid passages are in themselves well known, and in prior art constructions it is usual to provide a rotary valve member closely fitted in a bore and having ports which connect respectively with the plurality of fluid passages, and control means to move the valve member either radially or axially to different control positions in which the respective ports are opened and closed in order to control the fluid flow in the passages. Such valves suffer from several disadvantages. In the first place, the valve member must be very closely fitted in its bore in order that leakage is reduced to a minimum. However, this leakage along and around the valve member is likely to vary with changes in temperature, which may effect the viscosity of the fluid and also the clearance between the valve member and its bore due to expansion or contraction of the parts. Furthermore, if foreign matter should enter the valve from one of the fluid passages it is likely to become jammed between the moving valve member and its bore because of the fine radial clearance. Finally, the valve member inevitably suffers wear after a long period of use, so that leakage increases with age and use.

One object of the present invention is to provide a fluid control valve in which the valve member is pressed radially on to a seating and is moved into another control position to engage another seating by being withdrawn from the one seating in a radial direction, then rotated within the valve body without making contact therewith into line with another seating, and then moved radially into engagement with this seating.

Another object is to provide a control valve for a plurality of fluid passages in which the valve member is of mushroom type and is firmly pressed into engagement with any one of a plurality of seatings, so that perfect fluid tightness is assured.

A further object is to provide a control valve for a plurality of fluid passages in which the valve member is provided with a resilient sealing ring and is adapted to be brought into engagement with any one of a plurality of seatings each controlling the flow in a fluid passage, and the valve member is arranged for radial movement into and out of engagement with any one of the seatings, and for rotational movement to bring it into alignment with any one of the plurality of seatings.

Still another object is to provide a fluid control valve in which the valve member is adapted to engage any one of a plurality of seatings each controlling a fluid passage and containing control means such that when operated the valve member is first withdrawn radially from engagement with one seating, then rotated into alignment with another selected seating, and finally moved radially into engagement with the selected seating.

Still a further object is to provide a multiple fluid control valve in which two or more control valves, each comprising a plurality of fluid passages, are operated in unison by one control means.

Yet another object is to provide a fluid control valve for a plurality of fluid passages which is economical to construct and yet provides highly efficient operation, with freedom from wear and liability to failure.

Additional objects will become apparent from a careful study of the following description of several preferred embodiments of the invention, given by way of example, with reference to the accompanying drawings in which—

FIGURE 1 is a sectional elevation through a fluid control valve according to one embodiment of the invention;

FIGURES 2 and 3 are sectional elevations taken in a plane perpendicular to the plane of the section of FIGURE 1, and showing the valve member respectively in the open and closed positions;

FIGURE 5 is a sectional elevation of a control means arranged to operate a group of four fluid control valves according to the invention; and FIGURE 6 is a partial sectional plan of the arrangement of FIGURE 5.

Figure 3:
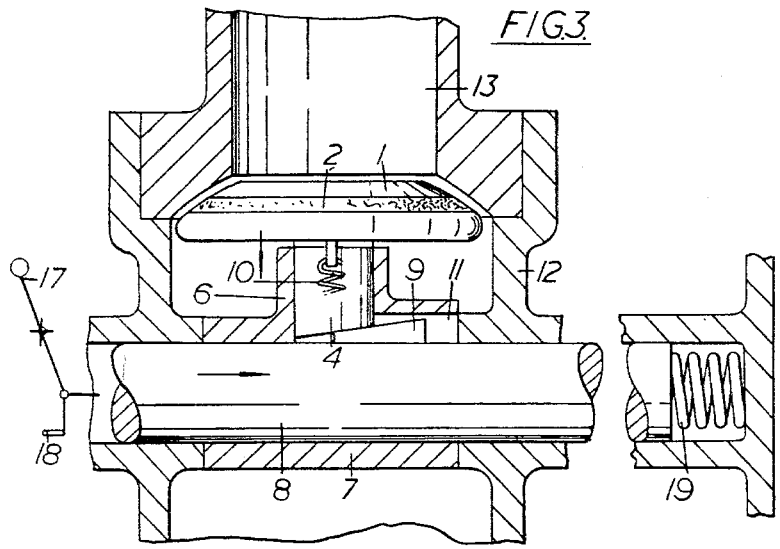

Referring now to FIGURES 1, 2 and 3 the invention comprises a body 12 having four fluid passages, respectively 13, 14, 15 and 16, radiating therefrom. These passages all radiate from a common centre, which is also the centre of the body 12, and the axes of the fluid passages lie in a common plane, which is coincident with the plane of the surface of the drawing. The ends of the fluid passages 13, 14, 15 and 16 terminate in valve seatings inside the body 12.

A mushroom type valve member 1 is provided with a resilient ring seal 2 and has a stem 3 which is enclosed by a bush 4. The bush 4 is freely movable in the radial direction within a tubular portion 6 extending transversely of a sleeve 7 carried on a control shaft 8, the control shaft 8 being axially movable within the sleeve 7, while the sleeve 7 is restrained against axial movement by end faces formed in the body. The valve member 1 is provided with two small lugs with which tension springs 10 are engaged, the other ends of the tension springs being engaged in further lugs formed on the sleeve 7 so that, due to the action of these springs, the valve stem 3 is drawn into the bush 4 so far as it will go, and the bush 4 is drawn into the tubular portion 6.

Mounted on the control shaft 8 is a wedge-shaped ramp 9, which engages the correspondingly sloped end surfaces of the bush 4.

A spring 19 is carried in an extension of the body 12 and bears upon the inner end of the shaft 8 to exert axial pressure thereon to move the control shaft 8 to the left in FIGURES 2 and 3. Thus, when the spring 19 is not opposed by a counter force the control shaft 8 is moved to the left in FIGURE 2 until the ramp 9 forces the valve member 1 radially outwards and into fluid sealing contact with the seating at the inner end of the fluid passage 13. By virtue of the acute angle of the ramp 9 with respect to the axis of the shaft, the valve member 1 is forced into firm contact with the seating, and since the valve member is wedged it cannot be forced off its seat, however high the fluid pressure may be in the passage 13. The resilient ring 2 ensures perfect sealing under all conditions of temperature and fluid pressure. If, for example, the valve member should tend to move off its seat due to expansion of the body the spring 19 will "follow up" and move the control shaft 8 to wedge the valve member back on to its seat.

For operating the valve a control means is provided which is shown diagrammatically in FIGURES 2 and 3, respectively in its two operating positions. It consists of a crank 18, or the equivalent, by which the control shaft 8 may be rotated about its axis, and a lever 17 by which the control shaft may be moved axially. This is the basic conception and, as will be shown later, the crank and lever may be combined into a single operating member. For changing the position of the valve member 1 from the fluid passage 13 to one of the other fluid passages, so that the passage 13 will be opened and one of the others will be closed, the lever 17 is moved from the position shown in FIGURE 2 to the position shown in FIGURE 3. This causes the control shaft 8 to be moved axially to the right against the force of the spring 19, which is compressed. The movement of the control shaft 8 displaces the ramp 9 and the springs 10 draw the valve member 1 away from its seating. The crank 18 is then rotated, with the lever 17 in the position shown in FIGURE 3, so that the sleeve 7 is carried around with the control shaft 8, and by virtue of the transverse extension 6 and the bush 4, the valve member 1 is also carried around until the valve member 1 is in radial alignment with the seating of whichever of the fluid passages 14, 15 or 16 is selected. The lever 17 is then released, when the control shaft 8 and the ramp 9 move to the left under the influence of the spring 19, and the valve member moved radially outwards into firm and perfect fluid-sealing contact with the seating associated with the selected fluid passage.

Figure 4:
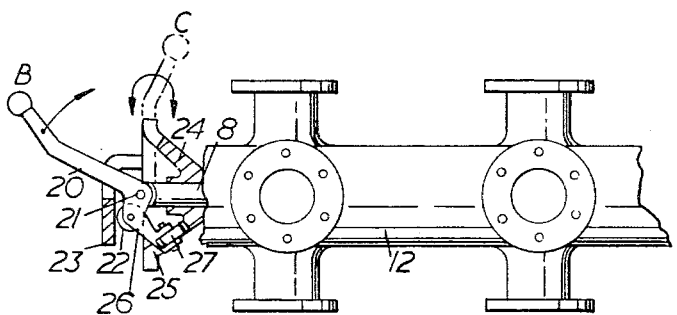
FIGURE 4 shows a pair of control valves according to the invention mounted in tandem and controlled by a single control means.

FIGURE 4 illustrates two control valves according to the invention, for controlling separate fluid circuits, coupled in tandem and adapted to be operated by a single control shaft 8, with control means coupled to the control shaft 8 to carry out the functions diagrammatically illustrated by the crank 18 and lever 17 of FIGURES 2 and 3. It will, of course, be understood that the body 12 shown in FIGURE 4 may be extended as indicated by the broken-off end to include any desired number of control valves and the control shaft 8 may extend through the whole of the control valves, or separate control shafts may be used, coupled together in such a manner that they move in the axial and rotational directions together. Similarly, separate single control valves may be coupled together one behind the other with their control shafts similarly coupled.

The control gear comprises a member 24 which is mounted on bearings so that it may rotate. It has one or more slots 25 spaced in accordance with the fluid passages comprised in the control valves. An angled member 23 is mounted with the member 24. The control shaft 8 is coupled to a lever 20 by a pivot 21 and the lever 20 has an extension 26 which carries a roller 27 of such diameter that it is a good fit in any one of the slots 25. The extension 26 of the lever 20 also carries a roller adapted to bear up on the inner face of the angled member 23.

In the position shown in FIGURE 4, the lever 20 is in a position B and the control shaft 8 is acted upon by a spring, which is not shown, but functions in the manner of the spring 19 to move the control shaft 8 to the left on the drawing. In this position the valve members 1 (not shown) in the two control valves are in engagement with one of the seatings. If the lever 20 is now moved to the position C, indicated in dotted lines, the roller 27 is moved out of the gate slot 25 in which it previously rested. Due to the action of the roller 22 the control shaft 8 is moved inwardly against the force of the spring, and the valve members in the two control valves are both moved radially inwards and out of engagement with the seatings with which they were previously engaged. The lever 20 may now be rotated to rotate the control shaft 8 and move the respective valve members into alignment with one of the other seatings. When the correct position is reached the lever 20 is released so that it returns under the influence of the spring to the position B and the respective valve members 1 are moved radially outwards into engagement with the seatings of the selected fluid passages.

FIGURES 5 and 6 illustrate control means arranged simultaneously to operate four control valves according to the invention, the control valves being arrainged in a circle.

The body of the control means is circular and has a central actuating shaft 30 which is urged outwardly of the body by a spring 49. The actuating shaft 30 projects through a sleeve formed in the cover of the body, the sleeve being integral with a conical gate member 36 having a circular track at its outer end. The gate member 36 is provided with a plurality of gate slots 35. A lever 28, corresponding to the lever 20 of FIGURE 4, is coupled to the end of the actuating shaft 30 by means of a pivot 29, and an extension 34 of the lever 28 carries a roller 33 which can engage any one of the gate slots 35 and is of such diameter that it is a good fit in any of the slots. A second roller 31, also carried on the lever 28, engages the inner face of a member 32 which is mounted on a bearing carried by the sleeve on the cover, so that the member 32 may rotate with the actuating shaft 30.

The control shafts of the control valves, respectively 37, 38, 39 and 40 (each corresponding to the control shaft 8 in the previous embodiments) are formed with necks near their ends and these are engaged by rollers carried on one end of bellcranks 41 which are pivoted on pivots 42. Each bellcrank is provided at its other end with a roller 43, all the rollers 43 being engaged by a disc 44 adapted to be reciprocated in a vertical direction in FIGURE 5 by vertical axial reciprocation of the actuating shaft 30 through the medium of a ball thrust bearing 46 containing a ring of balls 45.

The control shafts 37, 38, 39 and 40 are each provided with a bevel gear 47, and a bevel gear 48, which is keyed to the actuating shaft 30, engages all the bevel gears 47, the engagement between the actuating shaft 30 and the bevel gear 48 being such that the actuating shaft 30 may reciprocate in the direction of its axis with respect to the gear 48 while the gear 48 is constrained to rotate with the shaft 30. The bevel gear 48 is axially located by the inner face of the cover of the body and a lug projecting inside the body.

In the position shown in FIGURE 5 the valve member 1 (not shown) in each of the control valves is in firm engagement with the seating associated with one of the fluid passages. To change the positions of these valve members the lever 28 is moved in the direction of the arrow shown in FIGURE 5, so that the roller 33 is lifted out of the slot 35 in which it was resting and is in the position in which it may run around the circular track, as indicated in dotted lines in the upper part of FIGURE 5. The movement of the lever 28, through the engagement of the roller 31 with the inner face of the member 32, causes the actuating shaft 30 to be moved downwardly in FIGURE 5. The downward movement of the shaft acting through the thrust bearing 46 and the disc 34 causes the bellcranks 41 to be moved to draw the control shafts 37, 38, 39 and 40 inwardly towards the axis of the actuating shaft 30, and the movements of the control shafts 37, 38, 39 and 40 causes the valve members 1 in the respective control valves to be moved radially inwards and out of engagement with the seatings with which they were previously engaged. The lever 28 is next rotated to a desired position and released to allow the roller 33 to enter another one of the gate slots 35. Rotation of the actuating shaft 30 causes the control shafts 37, 38, 39 and 40 to be rotated through the medium of the bevel gear 48 and the four bevel gears 47 mounted on the control shafts, so that the valve members 1 in the respective control valves are rotated, and since the gate slots 35 are appropriately positioned, the valve members 1 are each rotated into alignment with a selected seating in the respective control valve. Release of the lever 28 causes the spring 49 to move the actuating shaft 30 upwardly, and this in turn rocks the lever 28 so that the roller 33 enters the selected gate slot 35. The upward movement of the actuating shaft 30 also allows the disc 44 to be lifted by the springs in the respective control valves, which all act to move their respective control shafts 37, 38, 39 and 40 outwardly and away from the axis of the shaft 30, the bellcranks 41 being appropriately rocked during this movement.

From the foregoing description, it will be evident that the invention provides a control valve in which a most effective high pressure seal is provided and in which the valve member may be moved from one seating to another in such a way that there is no frictional engagement with any other part during the movement of the valve member, so that wear of the valve member and the seating are virtually non-existent.

Various modifications may be made by those skilled in the art in the design and arrangement of the control valve and of the operating means without departing from the scope and spirit of the invention as defined in the appended claims.

I claim:

1. A fluid control valve comprising a body having a plurality of fluid passages, each fluid passage terminating in a valve seating inside said body, the valve seatings being disposed on axes lying in a common plane and radiating from a common centre, a valve member in said body having a stem, said valve member being rotatable in said plane about said common centre and also movable radially to engage any one of said valve seatings, a control shaft disposed with its axis passing through said comon centre and normal to said plane, a sleeve mounted on said control shaft the latter being axially slidable with respect to said sleeve, said sleeve being rotatable with said shaft and located against axial movement within said body, a lateral tubular extension on said sleeve, a bush enclosing the stem of said valve member and slidable within said tubular extension, a longitudinal wedge-shaped ramp secured to said control shaft and engaging the end of said bush, springs coupled between said valve member and said sleeve to urge said valve member radially out of engagement with said seatings, and a further spring acting to move said control shaft axially in one direction to push said bush outwardly of said extension and cause said valve member to engage a seating, whereby axial movement of said control shaft in the other direction allows said valve member to be drawn radially out of engagement with said valve seating, and rotation of said control shaft with said valve member withdrawn allows said valve member to be rotated into axial alignment with a selected one of said valve seatings for release into engagement with said selected one of said valve seatings by the action of said further spring.

2. A control valve as claimed in claim 1 comprising a lever coupled to move said control shaft axially through said sleeve and to rotate said control shaft, a circular gate having gate slots engaged by said lever when said lever is in rotational positions such that said valve member is in radial alignment with any one of said seatings, whereby said lever cannot be rotated unless it has first been moved out of a gate slot, the movement of said lever out of said gate slot causing axial movement of said control shaft in said sleeve.

3. A group control valve comprising a plurality of control valves as claimed in claim 1, said control valves being coupled in tandem and having a common control shaft whereby actuation of said common control shaft causes all the control valves of said plurality to be actuated.

4. A group control valve as claim in claim 3 comprising a lever coupled to move said common control shaft axially in said other direction and to rotate said control shaft, a circular gate having gate slots engaged by said lever when said lever is in rotational positions such that the valve members of the respective control valves are in radial alignment with one of the respective seatings, whereby said lever must first be moved out of a gate slot to move said control shaft in said other direction before it can be rotated to cause said valve members to be rotated into radial alignment with other seatings, release of said lever when opposite one of said gate entrances allowing said further spring to move said common control shaft axially in said one direction.

5. A group control valve comprising a casing having mounted thereon a plurality of control valves as claimed in claim 1, the control valves of said plurality being mounted on said casing with their control shafts projecting into said casing with the axes thereof lying in a common plane and meeting at a common centre, said control shafts each being provided with a neck, a number of bellcranks equal to the number of control shafts each having one end engaged in the neck of a respective control shaft, an actuating shaft carried in said casing with its axis normal to said plane and passing through said common centre, a member on said actuating shaft rotatable with respect thereto and constrained to move axially in one sense therewith to engage the other ends of said bellcranks and to move all said control shafts simultaneously in said other direction, a bevel gear on each of said control shafts, a further bevel gear on said actuating shaft constrained to rotate with said actuating shaft but axially movable with respect thereto, all said bevel gears being in mesh with said further bevel gear, an actuating shaft spring to move said actuating shaft axially in the other sense, a lever coupled to said actuating shaft to move said actuating shaft axially against said spring and to rotate said actuating shaft, and a circular gate member having gate slots engaged by said actuating lever when said actuating lever is in any rotational position such that the valve members of the respective control valves are in radial alignment with one of the respective valve seatings, whereby movement of said lever out of one of said gate slots causes said actuating shaft to be moved axially to rock said bellcranks to move the control shafts of all said control valves and cause the respective valve members thereof to be drawn radially out of engagement with a respective valve seating, rotation of said lever results in rotation of said actuating shaft and causes the control shafts of said control valves to be rotated through said bevel gears thereby rotating the valve members, and release of said lever opposite one said gate slots allows said actuating shaft to move axially in said other sense to allow said control shafts to be moved to release said valve members to engage selected valve seatings.

References Cited by the Examiner

UNITED STATES PATENTS

| 373,000 | 11/87 | Zehren | 251—158 |
| 2,097,285 | 10/37 | Lundgren | 251—163 XR |
| 2,439,393 | 4/48 | Kerr | 74—471 |

FOREIGN PATENTS

| 959,819 | 10/49 | France. |
| 1,224,455 | 2/60 | France. |
| 406,891 | 12/24 | Germany. |
| 79,679 | 2/52 | Norway. |

ISADOR WEIL, *Primary Examiner.*

WILLIAM F. O'DEA, *Examiner.*